(12) United States Patent
Weichholdt et al.

(10) Patent No.: US 7,651,391 B2
(45) Date of Patent: Jan. 26, 2010

(54) HARVESTED CROP REMAINS OUTPUT APPARATUS FOR A COMBINE THAT CAN BE SWITCHED BETWEEN BROAD DISTRIBUTION AND EJECTION ELBOW OPERATING MODE

(75) Inventors: Dirk Weichholdt, Woelfling les Sarreguemines (FR); Rico Priesnitz, Lebach (DE); Fritz K. Lauer, Krähenberg (DE); Oliver Klein, Lebach (DE); Chad A. Dow, East Moline, IL (US); Joel D. Ferris, Davenport, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 12/187,714

(22) Filed: Aug. 7, 2008

(65) Prior Publication Data

US 2009/0042626 A1 Feb. 12, 2009

(30) Foreign Application Priority Data

Aug. 8, 2007 (DE) .................. 10 2007 037 497

(51) Int. Cl.
*A01F 12/30* (2006.01)
(52) U.S. Cl. ...................... 460/111; 460/115
(58) Field of Classification Search .............. 460/111, 460/112, 114, 115, 901; 415/201, 224
See application file for complete search history.

(56) References Cited

U.S. PATENT DOCUMENTS 3,071,246 A 1/1963 Schimke
3,669,123 A 6/1972 Gaeddert et al.
3,833,006 A * 9/1974 Temple .................... 460/99
5,021,028 A * 6/1991 Kersting et al. .............. 460/85
6,616,527 B2 * 9/2003 Shinners et al. ............ 460/6

(Continued)

FOREIGN PATENT DOCUMENTS

DE 960683 C 3/1957

(Continued)

OTHER PUBLICATIONS

European Search Report dated Nov. 24, 2008, (4 pages).

*Primary Examiner*—Alicia M Torres
(74) *Attorney, Agent, or Firm*—Taylor & Aust, P.C.

(57) ABSTRACT

A harvested crop remains output apparatus for a combine can alternate between a broad distribution operating mode and an ejection elbow operating mode. The harvested crop remains output apparatus includes a housing having a first opening and a second opening; a flap associated with the first opening of the housing; a flap associated with the second opening of the housing; an output conveyor for tangentially conveying harvested crop remains arranged in the housing; a broad distribution arrangement arranged downstream of the first opening; an ejection elbow arranged downstream of the second opening; and a plurality of selection devices for selectively conveying harvested crop remains to the broad distribution arrangement or the ejection elbow. The plurality of selection devices include a first flap associated with the first opening and a second flap associated with the second opening. During the broad distribution operating mode the first flap is opened and the second flap is closed, and during the ejection elbow operating mode the second flap is opened and the first flap is closed.

11 Claims, 2 Drawing Sheets

U.S. PATENT DOCUMENTS

| | | | |
|---|---|---|---|
| 6,718,746 B2 * | 4/2004 | Hettiger et al. | 56/11.7 |
| 6,863,605 B2 * | 3/2005 | Gryspeerdt et al. | 460/111 |
| 7,094,146 B2 * | 8/2006 | Holmen | 460/111 |

FOREIGN PATENT DOCUMENTS

| | | |
|---|---|---|
| DE | 1006195 B | 4/1957 |
| SU | 376054 A1 | 1/1978 |

\* cited by examiner

HARVESTED CROP REMAINS OUTPUT APPARATUS FOR A COMBINE THAT CAN BE SWITCHED BETWEEN BROAD DISTRIBUTION AND EJECTION ELBOW OPERATING MODE

BACKGROUND OF THE INVENTION

1. Field of the Invention

The present invention relates to a harvested crop remains output apparatus for a combine that can be switched between a broad distribution operating mode and an ejection elbow operating mode.

2. Description of the Related Art

Agricultural combines are large machines that harvest, thresh, clean and separate agriculturally planted crops that carry grain. The clean grain thus gained is stored in a grain tank on the combine. As a rule, the threshed out fodder (referred to as straw herein) is either chopped and distributed on the field across the width of the cutter head or conducted around the straw chopper and deposited in a swath on the field without chopping, in order to be able to take it up later with a baler. The harvested crop remains located at the rear outlet of the cleaning arrangement, such as chaff and small straw particles, are usually distributed across the field by a chaff spreader or conducted to the straw chopper and distributed across the field.

It has also been proposed that the harvested crop remains be conducted through an ejection elbow in order to be able to deposit them on a trailer for further utilization. U.S. Pat. No. 3,669,123 A describes such an arrangement in which a housing extending into an ejection elbow extending at an angle upward and to the rear is retained in a removable housing attached by sliding bolts underneath the straw chopper. The housing then conducts the straw onto a trailer or the like. On the other hand, if the straw is to be distributed across a field, then the housing must be removed and replaced by another appropriate distribution arrangement. This process is very time consuming.

SU 376,054 A describes a combine in which the straw is chopped by a chopper operating with stationary knives downstream of the straw shaker and then conducted downward to a transverse screw conveyer that conducts it either to a distribution box with sheet metal distribution blades for broad distribution across a field or to an ejection elbow in order to deposit it on a trailer. The switching is performed by rotating the entire housing about an axis extending horizontally and transverse to the direction of operation which makes it possible to connect an outlet of the housing either to the ejection elbow or to the distribution box. Since the entire housing must be rotated, a rather large expense must be met.

What is needed in the art is a harvested crop remains output arrangement for a combine that can be switched between a broad distribution operating mode and a discharge elbow operating mode of the kind cited above that makes possible the switching between the two operating modes in a simple and reliable way.

SUMMARY OF THE INVENTION

The present invention provides an apparatus, namely, a harvested crop remains output arrangement for a combine including an output conveyor for harvested crop remains operating tangentially (the harvested crop remains may include straw and/or chaff), the output conveyor being arranged within a housing with two openings. A first opening leads to a broad distribution arrangement with which the harvested crop remains can be distributed across the field approximately over the width of the cutter head. A second opening leads to an ejection elbow with which the harvested crop remains can be delivered to a trailer or any other desired transport vehicle. The first opening is associated with a first flap, while the second opening is associated with a second flap. For operation in the broad distribution operating mode, the first flap can be brought into an open position, while the second flap then can be brought into a closed position in order to be able to conduct the harvested crop remains exclusively to the broad distribution arrangement. For the ejection elbow operating mode, the first flap can be brought into a closed position, while the second flap can then be brought into an open position, in order to be able to conduct the harvested crop remains exclusively to the ejection elbow. In the closed positions as well as the open positions, the flaps can be locked with a detent. Their movement between the open and the closed positions can be performed manually by an operator or by an actuator using external forces, for example, an electric motor or a hydraulic cylinder from the operator's station.

In this way the result is a simple switch between the ejection elbow operating mode and the broad distribution operating mode in which the intrusion of harvested crop remains into undesired openings of the housing is avoided.

The two flaps can be pivoted between the open and the closed positions. In another embodiment, however, they can slide along a straight line or along a circular arc that conforms, in particular, to the shape of the housing of the output conveyor.

In one embodiment of the present invention, in order to improve the conveying of the harvested crop remains by the output conveyor in the closed condition of the flaps, the two flaps conform to the radius of the housing so that the spacing between the output conveyor and the flaps corresponds to the spacing between the output conveyor and its housing and nor narrowing or widening of the flow occurs that could impair the flow of the crop between the output conveyor and the flaps in which the harvested crop could collect.

The first opening is preferably offset relative to the second opening in the circumferential direction of the housing and is arranged underneath the second opening, so that the harvested crop remains in the broad distribution operating mode can be conducted through the first opening to the rear to the broad distribution operating arrangement while they reach the ejection elbow upward in the ejection elbow operating mode; so that the harvested crop remains are delivered by the output conveyor which rotates about a horizontal axis extending transverse to the forward operating direction of the combine.

The two openings extend preferably over the entire width of the housing and a transition housing is provided for the ejection elbow that narrows in the direction of flow, so that an output end narrowing in the direction of flow can be connected that can be rotated about a vertical axis with an output flap that can rotate about a horizontal axis.

The output conveyor is preferably a straw chopper with a rotor rotating about a horizontal axis and chopper knives distributed around its circumference. However, it would also be conceivable to use one or more blowers arranged downstream of a straw chopper as an output conveyor, the blades of the blowers rotating about horizontal and vertical axes.

The broad distribution arrangement can include a number of guide surfaces arranged side-by-side for the transverse scattering of the harvested crop remains. In another embodiment, ejection blowers can be used with ejection paddles rotating about horizontal and vertical axes.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
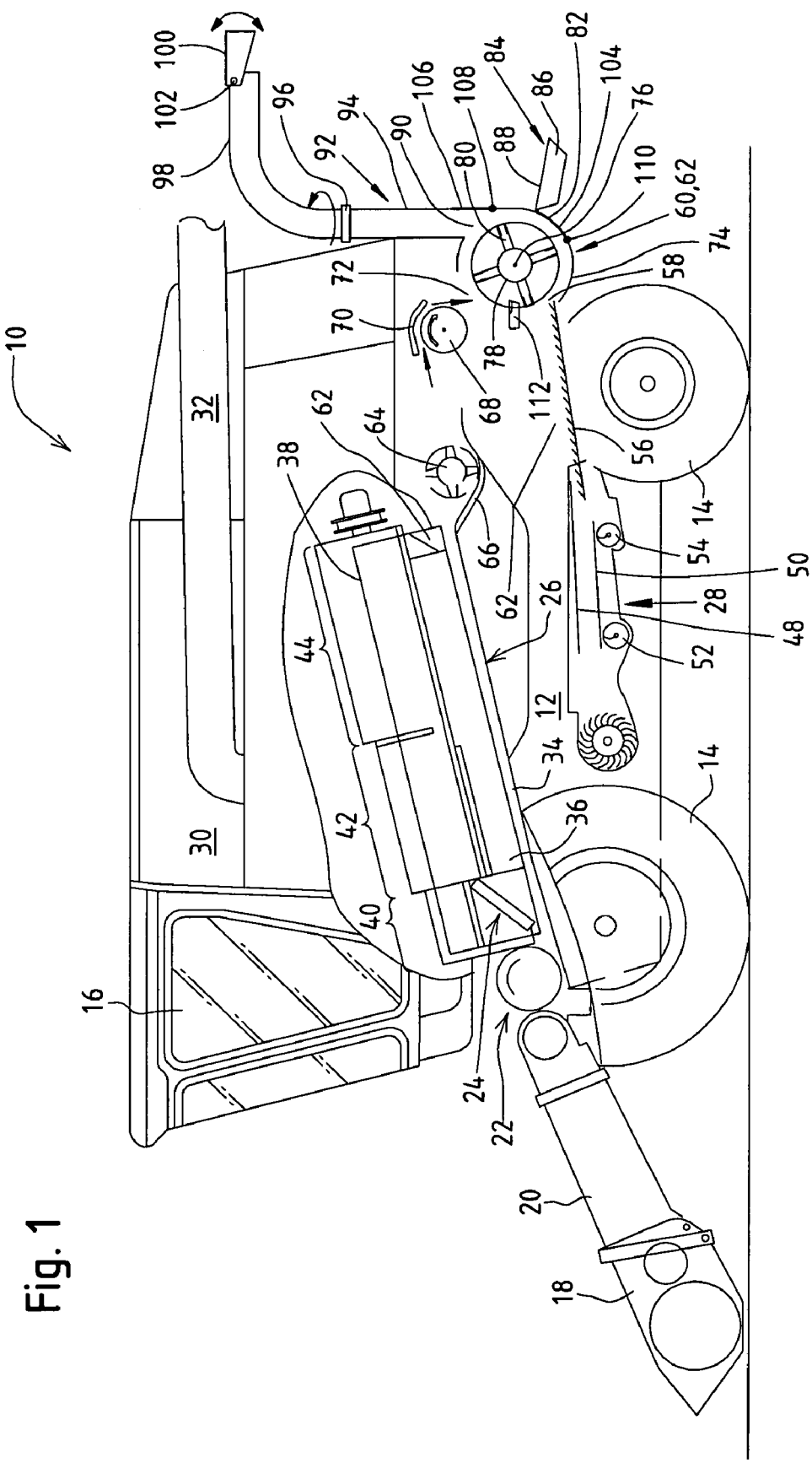
FIG. 1 shows a partial sideway section of a combine with a harvested crop remains output arrangement that can be switched between broad distribution operating mode and ejection elbow operating mode according to the invention.
Figure 2:
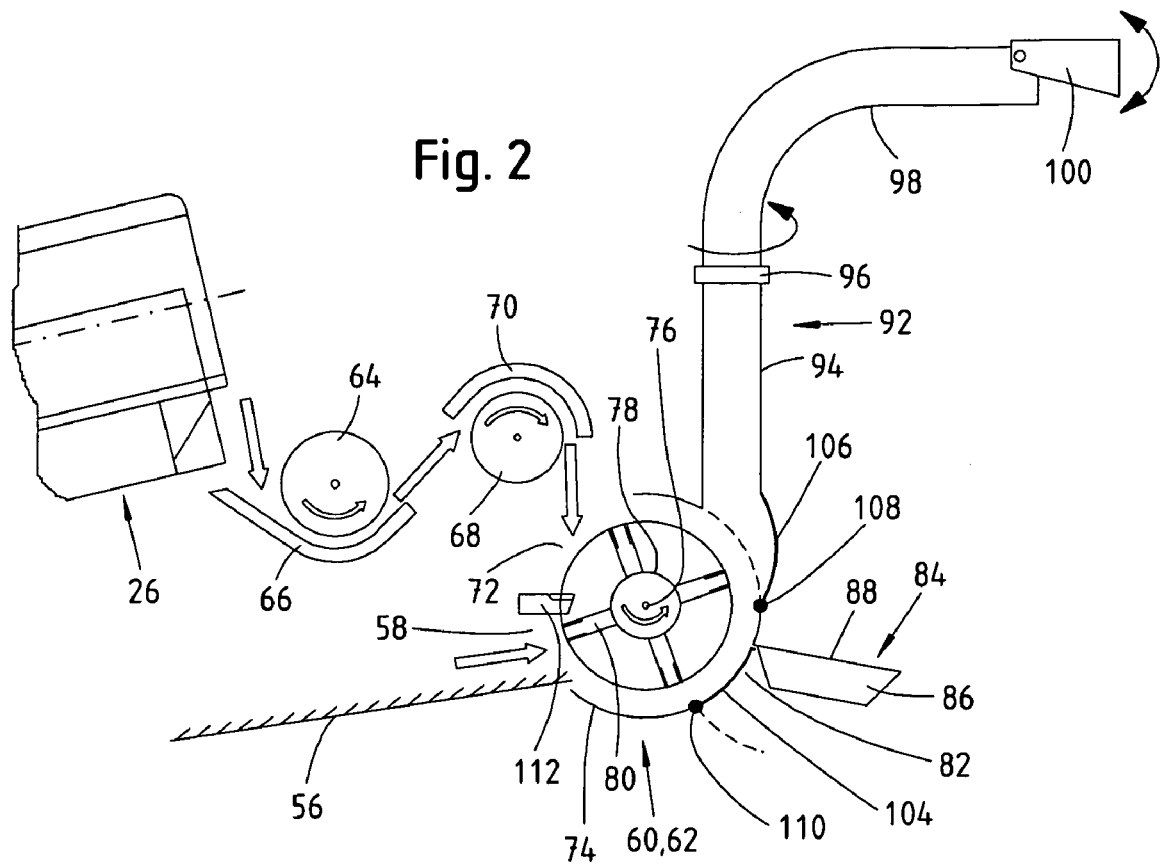
FIG. 2 shows an enlarged side view of the harvested crop remains output arrangement of FIG. 1.
Figure 3:
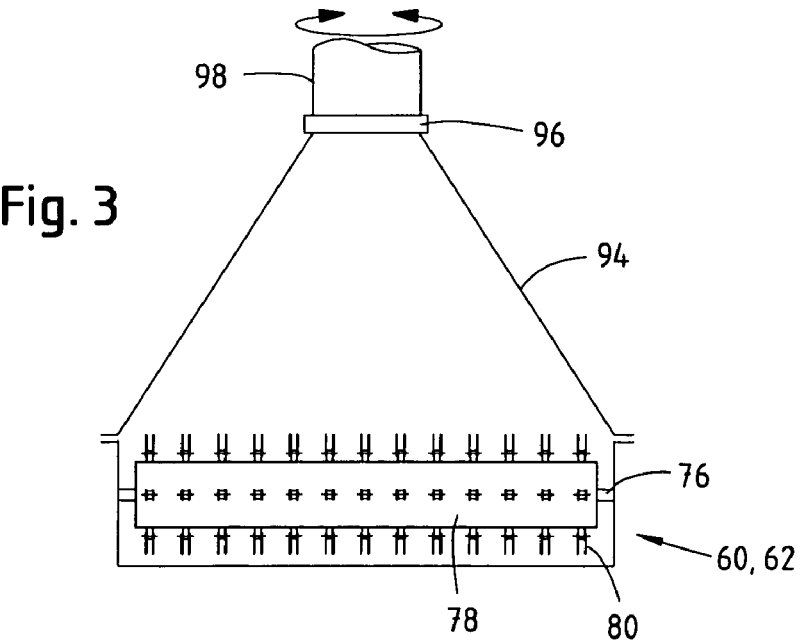
FIG. 3 shows a rear view of the harvested crop remains output arrangement.

Referring now to the drawings, and more particularly, to FIGS. 1-3, there is shown an agricultural combine 10 with chassis 12 with wheels 14 in contact with the ground that are fastened to chassis 12 and are used for the propulsion of combine 10 in a forward operating direction which extends to the left in FIG. 1. The operation of combine 10 is controlled from operator's cab 16. Cutter head 18 is used to harvest harvested crop containing grain and to conduct it to slope conveyor 20. The harvested crop is conducted by slope conveyor 20 to guide drum 22. Guide drum 22 guides the harvested crop through inlet transition section 24 to axial harvested crop processing arrangement 26. In the following directions, "front" and "rear" refer to the forward operating direction of combine 10 that extends to the left in FIG. 1.

Harvested crop processing arrangement 26 includes rotor housing 34 with rotor 36 arranged within it. Rotor 34 includes hollow drum 38 to which crop processing elements are fastened for charging section 40, threshing section 42, and separating section 44. Charging section 40 is arranged on the forward side of axial harvested crop processing unit 26. Threshing section 42 and separating section 44 are located downstream in the longitudinal direction and to the rear of charging section 40. In charging section 40, drum 38 is in the form of a truncated cone. Threshing section 42 includes a forward section in the form of a truncated cone and a cylindrical rear section. Cylindrical separating section 44 of drum 38 is located at the end of axial harvested crop processing unit 26. Alternatively, in place of axial harvested crop processing unit 26, a tangential thresher drum and an axial separating arrangement immediately following it may be utilized or a straw shaker could be used (as indicated in FIG. 2).

Grain and chaff that fall through a thresher basket associated with threshing section 42 and a separating grate associated with separating section 44 are conducted to cleaning system 28 with blower 46 and disk-shaped sieves 48, 50 that can be oscillated. Cleaning system 28 removes the chaff and conducts the clean grain by means of screw conveyor 52 to an elevator for clean grain (not shown). The elevator for clean grain deposits the clean grain in grain tank 30. The clean grain in grain tank 30 can be unloaded by unloading screw conveyor 32 to a grain wagon, trailer or truck. Harvested crop remaining at the rear end of lower disk-shaped sieve 50 is again conducted to harvested crop processing arrangement 26 by means of screw conveyor 54 and an overhead conveyor (not shown) and returned to harvested crop processing arrangement 26. The harvested crop remains delivered at the rear end of upper disk-shaped sieve 48 that consist essentially of chaff and small straw particles are conveyed to the rear by means of oscillating chute conveyor 56 into lower inlet 58 of output conveyor 60 in the shape of straw chopper 62.

Threshed out straw leaving separating section 44 is ejected by harvested crop processing arrangement 26 through outlet $62^1$ and conducted to ejection drum 64. Ejection drum 64, which interacts with chute 66 underneath it, ejects the straw to the rear. Conveyor drum 68 located to the rear of ejection drum 64 guides the straw interacting with upper guide chute 70 downward into an upper inlet of straw chopper 62.

Straw chopper 62 is composed of housing 74 and rotor 78 arranged within it that can rotate about horizontal axis 76 extending transverse to the forward operating direction with chopper knives 80 suspended in pairs and distributed around the circumference of the rotor which interact with stationary knives 112 fastened to the housing. In the lower, rear area housing 74 is provided with first opening 82 extending over the width of straw chopper 62, behind which broad distribution arrangement 84 follows which is provided with a number of sheet metal guide vanes 86 arranged alongside each other for the transverse scattering and distribution of the harvested crop remains onto the field across the width of cutter head 18, the distribution arrangement is attached underneath sheet metal floor 88. Moreover, housing 74 is provided with second opening 90 in an upper, rear area above which ejection elbow 92 follows. Ejection elbow 92 includes transition housing 94, whose lower end extends over the width of straw chopper 62. Transition housing 94 narrows in the upward direction and ends in slewing ring 96 as is shown in FIG. 3. At slewing ring 96 that can rotate about the vertical axis output end 98 is attached with output flap 100 that can move about horizontal axis 102. The rotational movement of slewing ring 96 about the vertical axis and of output flap 100 about horizontal axis 102 are performed by appropriate actuators actuated by outside forces (not shown), in particular, electric motors or hydraulic motors or cylinders, controlled from operator's cab 16.

In order to be able to conduct the harvested crop remains (straw and/or chaff) in the broad distribution operating mode only to broad distribution arrangement 84 and in an ejection elbow operating mode only to ejection elbow 92, corresponding selection devices are provided that include first flap 104 associated with first opening 82 and second flap 106 associated with second opening 90. First flap 104 is connected in joints, free to pivot, about housing 74 with its first, lower (upstream) end about horizontal axis 110 between the position shown in which it closes first opening 82 without an offset relative to housing 74 and an open position (shown in dashed lines in FIGS. 1 and 2) in which it is pivoted downward and frees first opening 82, it is actuated by an actuator actuated by external forces, not shown, or manually by the operator. Analogously second flap 106 is connected in joints to housing 74 at its forward, lower (upstream) end, free to pivot, about horizontal axis 108 and can be pivoted by an actuator, not shown, actuated by external forces or manually by an operator between the position shown, in which it frees second opening 90 and a closed position shown in FIGS. 1 and 2 in dashed lines, in which it is pivoted downward and closes opening 90 without offset against housing 74. The positions of flaps 104, 106 shown in FIGS. 1 and 2 in sold lines correspond to the ejection elbow operating mode in which the harvested crop remains are conducted to ejection elbow 92, while the positions of flaps 104, 106 shown there in dashed lines correspond to the broad distribution operating mode in which the harvested crop remains are conducted to broad distribution arrangement 84. The curvatures of flaps 104, 106 correspond to the radius of housing 74.

What is claimed is:

1. A harvested crop remains output apparatus for a combine that can alternate between a broad distribution operating mode and an ejection elbow operating mode, comprising:
    a housing having a first opening and a second opening;
    an output conveyor for tangentially conveying harvested crop remains arranged in said housing, the output conveyor rotating about a horizontal axis;
    a broad distribution arrangement arranged downstream of said first opening of said housing of said output conveyor;
    an ejection elbow arranged downstream of said second opening of said housing of said output conveyor;
    a plurality of selection devices for selectively conveying the harvested crop remains to one of said broad distribution arrangement and said ejection elbow, said plurality of selection devices including a first flap associated with said first opening and a second flap associated with said second opening;
    wherein during the broad distribution operating mode said first flap is opened and said second flap is closed, and during the ejection elbow operating mode said second flap is opened and said first flap is closed, said first flap being substantially concentric with said horizontal axis when said first flap is closed, said second flap being substantially concentric with said horizontal axis when said second flap is closed, said first flap not being substantially concentric with said horizontal axis when said first flap is opened, said second flap not being substantially concentric with said horizontal axis when said second flap is opened.

2. The harvested crop remains output apparatus of claim 1, wherein at least one of said first flap and said second flap are arranged such that they can be pivoted.

3. The harvested crop remains output apparatus of claim 1, wherein at least one of said first flap and said second flap are curved so as to conform to a radius of said housing.

4. The harvested crop remains output apparatus of claim 1, wherein said first opening and said second opening are offset in a circumferential direction of said housing.

5. The harvested crop remains output apparatus of claim 4, wherein said second opening is located above said first opening.

6. The harvested crop remains output apparatus of claim 1, wherein said first opening and said second opening each extend over an entire width of said housing.

7. The harvested crop remains output apparatus of claim 1, wherein said ejection elbow includes a transition housing which narrows in a direction of flow.

8. The harvested crop remains output apparatus of claim 1, wherein said ejection elbow includes an output end rotatable about a vertical axis.

9. The harvested crop remains output apparatus of claim 8, further including an output flap at said output end, said output flap being moveable about a horizontal axis.

10. The harvested crop remains output apparatus of claim 1, wherein said output conveyor includes a straw chopper, a rotor rotatable about a horizontal axis, and chopper knives distributed about a circumference of said straw chopper.

11. The harvested crop remains output apparatus of claim 1, wherein said broad distribution arrangement includes a plurality of sheet metal guide vanes arranged alongside each other.

* * * * *